United States Patent
Patel et al.

(10) Patent No.: US 11,192,343 B2
(45) Date of Patent: Dec. 7, 2021

(54) SELF-DESTRUCTIVE IRREVERSIBLE SECURITY PACKAGING FILM

(71) Applicant: Arrow Greentech Limited, Maharashtra (IN)

(72) Inventors: Shilpan Pravinchandra Patel, Mumbai (IN); Nikita Kamlesh Thanawala, Mumbai (IN)

(73) Assignee: ARROW GREENTECH LIMITED, Mumbai (IN)

( * ) Notice: Subject to any disclaimer, the term of this patent is extended or adjusted under 35 U.S.C. 154(b) by 0 days.

(21) Appl. No.: 16/216,469

(22) Filed: Dec. 11, 2018

(65) Prior Publication Data

US 2019/0134960 A1    May 9, 2019

Related U.S. Application Data

(60) Continuation of application No. 15/200,878, filed on Jul. 1, 2016, now abandoned, which is a continuation
(Continued)

(30) Foreign Application Priority Data

Apr. 15, 2005    (IN) .......................... 469/MUM/2005

(51) Int. Cl.
*B32B 27/08*    (2006.01)
*B32B 9/02*    (2006.01)
(Continued)

(52) U.S. Cl.
CPC .............. *B32B 27/08* (2013.01); *B05D 5/066* (2013.01); *B05D 5/068* (2013.01); *B05D 7/52* (2013.01);
(Continued)

(58) Field of Classification Search
CPC ......... B32B 27/08; B32B 27/10; B32B 27/12; B32B 27/20; B32B 2317/20;
(Continued)

(56) References Cited

U.S. PATENT DOCUMENTS 5,424,182 A    6/1995    Marginean, Sr. et al.
5,495,944 A    3/1996    Lermer
(Continued)

FOREIGN PATENT DOCUMENTS

EP    1050482 A1    11/2000
EP    1065154 A2    1/2001
(Continued)

OTHER PUBLICATIONS

International Search Report for corresponding application PCT/IN2006/000133 dated Jan. 25, 2007.
(Continued)

*Primary Examiner* — Laura C Powers
(74) *Attorney, Agent, or Firm* — Sandberg Phoenix & von Gontard, P.C.

(57) ABSTRACT

An irreversibly self-destructive security packaging water soluble film and method for manufacturing the same. The water soluble packaging film is embedded with various security elements, which will get irreversibly destroyed upon final usage as the whole package along with its contents will dissolve in water. This process of self-destruction will control the duplication of the package or alteration of the product inside the package.

15 Claims, 2 Drawing Sheets

Related U.S. Application Data of application No. 14/025,379, filed on Sep. 12, 2013, now Pat. No. 9,421,575, which is a division of application No. 11/918,516, filed as application No. PCT/IN2006/000133 on Apr. 17, 2006, now abandoned.

(51) Int. Cl.

| | | |
|---|---|---|
| *B32B 15/08* | (2006.01) | |
| *B32B 27/12* | (2006.01) | |
| *B32B 27/10* | (2006.01) | |
| *B32B 7/02* | (2019.01) | |
| *B32B 27/20* | (2006.01) | |
| *B05D 5/06* | (2006.01) | |
| *B05D 7/00* | (2006.01) | |
| *B41M 3/14* | (2006.01) | |
| *B65D 65/46* | (2006.01) | |

(52) U.S. Cl.
CPC ............... *B32B 7/02* (2013.01); *B32B 9/02* (2013.01); *B32B 15/08* (2013.01); *B32B 27/10* (2013.01); *B32B 27/12* (2013.01); *B32B 27/20* (2013.01); *B41M 3/14* (2013.01); *B65D 65/46* (2013.01); *B32B 2317/20* (2013.01); *B32B 2439/00* (2013.01); *Y10T 428/24612* (2015.01)

(58) Field of Classification Search
CPC ......... B32B 2439/00; B32B 7/02; B32B 9/02; B05D 7/52; B05D 5/066; B05D 5/068; B41M 3/14; B65D 65/40; B65D 65/46; Y10T 428/24612

See application file for complete search history.

(56) References Cited

U.S. PATENT DOCUMENTS

| | | |
|---|---|---|
| 5,666,785 A | 9/1997 | Jouffreau et al. |
| 6,053,406 A | 4/2000 | Litman |
| 6,346,321 B1 | 2/2002 | Stober et al. |
| 2003/0060387 A1 | 3/2003 | Hsu et al. |
| 2003/0173046 A1 | 9/2003 | Jaaskelainen et al. |
| 2006/0154030 A1 | 7/2006 | Kastner et al. |
| 2010/0193146 A1 | 8/2010 | Patel |

FOREIGN PATENT DOCUMENTS

| | | |
|---|---|---|
| EP | 1452338 A1 | 9/2004 |
| GB | 2289040 A | 11/1995 |
| WO | 2004048113 A1 | 6/2004 |

OTHER PUBLICATIONS

International Written Opinion for corresponding application PCT/IN2006/000133 dated Jan. 25, 2007.

SELF-DESTRUCTIVE IRREVERSIBLE SECURITY PACKAGING FILM

CROSS-REFERENCE TO RELATED APPLICATIONS

This application is a continuation of application Ser. No. 15/200,878, filed Jul. 1, 2016, which is a continuation of application Ser. No. 14/025,379, filed Sep. 12, 2013, now U.S. Pat. No. 9,421,575, which in turn is a divisional of application Ser. No. 11/918,516 filed Oct. 15, 2007. Application Ser. No. 11/918,516 is the US National Stage of International Application No. PCT/IN2006/000133 filed Apr. 17, 2006 (and which was amended on Mar. 22, 2007) and which claims priority to Indian Pat. App. No. 469/MUM/2005, filed Apr. 15, 2005. All of said applications, including the amendments thereto, are incorporated herein by reference.

FIELD OF THE INVENTION

The invention relates to an irreversibly self-destructive security packaging water soluble film and method for manufacturing the same. The water soluble packaging film is embedded with various security elements, which will get destroyed irreversibly upon final usage as the whole package along with its contents will dissolve in water. This process of self-destruction will control the duplication of package or alteration of the product inside the package.

BACKGROUND OF INVENTION

Securing a product like pesticides, agrochemicals, cosmetics, etc. have been in urgent need by the industry. Simulation, alteration and duplication of genuine products have always been rampant in today's world. No forceful solution has been found to ensure that the security package itself gets used up every time the end product/content is being consumed.

There have been several methods of securing a product by means of printing security tracers, or by affixing varied OVDs like holograms, or color shifting inks etc., but these are usually on packages. Once the package is successfully opened, the original product can be replaced by a duplicate and the resultant product can be brand damaging and may lead to legal suits. Many times the package is discarded after the contents are used and this same package becomes a target for unlawful duplication.

There have been several attempts in the past to either encase or laminate or package different security elements in films, but none have proved fool proof and successful for such varied end uses.

One such patent WO 2004048113 relates to a blister film partially applied with security feature. The application of the security features ensues by detaching the security feature from a supporting substrate, which is provided with a UV-curable separating paint that is capable of being deep-drawn.

Here, the blister film with security feature can be tampered or a discarded package can be reused for packaging a duplicate product.

It is a long-standing need of industry to develop efficient and cost effective methods for the manufacture of fool proof security packages for controlling piracy, simulation, alteration or duplication of original products in diverse applications and especially a unique all-encompassing packaging film that is capable of irreversibly destroying itself. Further, the need for carriers that can selectively carry a combination of materials with dissimilar properties such as miscible/immiscible, hydrophobic/hydrophilic security materials continues to elude the industry.

SUMMARY OF THE INVENTION

The present invention relates to a security package which has built-in embedded security elements which form a part of the package itself. This package is not needed to be opened, and is self-destructing. The package itself is part of the product and delivers the security features. After the final usage of package, the packaging material including security elements are self-destroyed irreversibly. The security elements and genuineness of the product/package can be verified, while it is on the shelf for distribution as well as off the shelf. The security elements may be traceable, if need arises, even after the security package and its contents have been consumed or delivered to desired location (e.g. soil, laundry) after the same has been dissolved in water.

The invention addresses various problems and also reduces costs and ensures that fraudsters are brought to book legally and action taken against them. It also ensures that new products and brands get their true value by ruling out any tampering, duplication and alteration of the product.

The main object of the invention is to provide an irreversibly self-destructive security packaging water soluble film to prevent duplication, alteration and simulation of the packed products.

Another object of the invention is to embed one or more security elements with similar and/or dissimilar properties into one or more layers of WSF to form a multi-layered WSF embedded with security features.

Yet another object of the invention is to provide the method of manufacturing an irreversibly self-destructive security packaging water soluble film wherein one or more security elements with similar and/or dissimilar properties are embedded into one or more layers of WSF to form a multi-layered WSF embedded with security elements.

As per the invention there is provided an irreversibly self-destructive security packaging water soluble film (WSF) for packages or the like, comprising one or more layer(s) of water soluble film and at least one inbuilt security element embedded or entrapped or imparted in at least one layer of the WSF forming a part of the security package which will destroy itself irreversibly during final usage after dissolving or dispersing in water.

As per the invention there is provided a security packaging WSF, wherein more than one security element of similar and/or dissimilar properties is embedded/entrapped or imparted in one or more layers of the WSF.

The WSF is a single layered or multi-layered film made of raw materials selected from polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, polymethacrylic acid, polyurethane, polyethyleneglycol, polyvinylpyrrolidone, proteinaceous binders such as gelatin, modified gelatins such as phthaloyl gelatin, polysaccharides such as starch, gum Arabic, pullulan and dextrin and water-soluble cellulose derivatives such as methyl cellulose, hydroxy propyl cellulose, hydroxy propyl methyl cellulose, hydroxy propyl ethyl cellulose, hydroxy ethyl cellulose, carboxy methyl cellulose either alone or combinations thereof.

The WSF is cold water soluble, warm water soluble, hot water soluble or non-soluble depending upon the formulation.

The security element(s) is/are of overt nature or of covert nature (i.e., are capable of being perceived or verified by human or machine) and are selected from optically variable pigments, multi-layer thin-film interference pigments, liquid crystal pigments, holographic pigments, interference coated particles, thermochromic pigments, photochromic pigments, luminescent compounds, magnetic compounds, infrared-absorbing compounds, UV-absorbing compounds, magnetic compounds, micro-engraved or microtextured flake pigments, forensic marking compounds, dyes, RFID taggants, nano-particles, nano-tracers, security markers printed security features like barcodes, metallized fibers, metallized/demetallized texts, active molecules, DNA taggants and the like.

The security element(s) is/are light source readable, machine readable PCR or otherwise readable by any mechanical, electrical or digital device.

The security elements, like holograms, barcodes, metallized/demetallized microtexts, are printed or embossed on the WSF forming a part of the WSF.

The security packaging WSF can be converted into self-adhesive web and further converted into a printed seal with a barcode including 2D or 3D barcode forming self-adhesive label/seal used for securing the openings of a package or a bottle.

As per the invention there is provided a method of manufacturing self-destructive irreversible security packaging WSF comprising following steps:
a. providing a formulation of said water soluble film,
b. casting said formulation to form a water soluble film,
c. embedding/entrapping at least one desired security element in said formulation of the water soluble film prior to and/or after casting the water soluble film; and
d. drying the film with the embedded security elements.

As per the invention, there is also provided a method of manufacturing an irreversibly self-destructive security packaging WSF comprising adding the security element(s) into at least one batch mixer containing batch solution of the WSF, mixing thoroughly and feeding to the primary or subsequent casting heads for further processing in a known manner to achieve security element(s) embedded WSF.

As per the invention there is also provided a method in which the security element(s) is/are introduced at the primary, secondary, tertiary or subsequent sprayers to achieve security element(s) embedded WSF.

As per the invention there is also provided a method of manufacturing security packaging WSF comprising the following steps:
a. unwinding a liner from an unwinder of the WSF casting machine,
b. mixing security element(s) with the WSF raw materials batch solution in a batch mixer,
c. casting WSF on the liner at the primary casting head of the casting machine, with embedded security element(s) and metering and smoothening the same,
d. drying the WSF with embedded security element(s) in the primary dryer section,
e. casting of another layer of WSF with or without the security element(s) embedded therein, at secondary casting head of the casting machine,
f. drying the multilayered WSF with embedded security element(s) in a secondary dryer section,
g. guiding the film of step (f) through hot chilled cylinder and rewinding or splitting at the rewinder.

As per the invention there is also provided a method of manufacturing security packaging WSF comprising the following steps:
a. unwinding a liner from an unwinder of the WSF casting machine,
b. casting of WSF on the liner with or without the security element(s) at the primary casting head and metering the cast film,
c. spraying the security element(s) by primary sprayer and smoothening the film,
d. drying the WSF of step (c) at the primary dryer section,
e. casting another layer of WSF with or without the security element(s) at secondary casting head,
f. drying the WSF with embedded security element(s) at the secondary dryer section,
g. guiding the multilayered WSF with embedded security element(s) of step (f) through hot cylinder for rewinding or splitting at a rewinder, As per the invention there is also provided a method of manufacturing security packaging WSF comprising of the following steps:
a. unwinding a liner from an unwinder of a WSF casting machine,
b. casting WSF with or without security element(s) and metering and smoothening the same,
c. drying the WSF of step (b) in the primary dryer section,
d. casting another layer of WSF with or without the security element(s) at a secondary casting head,
e. drying the WSF of step (d) in the secondary dryer section,
f. unwinding a preformed WSF with or without liner from another unwinder and guiding it to meet the WSF from step (e),
g. entrapping security element(s) between the semi-cured WSF of step (e) and the preformed WSF,
h. guiding the multilayered WSF with entrapped security element(s) through hot cylinder for rewinding or splitting at a rewinder.

As per the invention there is also provided a method of manufacturing security packaging WSF comprising the following steps:
a. unwinding two WSFs with or without the liners from two unwinders,
b. dispensing the security element(s) in between the two WSFs;
c. rewinding the multilayered WSF with entrapped security element(s) in roll form or sheet form or fan-fold form.

The security element(s) is/are dispensed in between the two incoming cured, semi-cured or uncured WSFs in vertical position or horizontal position to be entrapped by the two WSFs.

The preformed WSFs used here can be water soluble films produced by a cast process or extrusion process.

The liner used is treated or untreated and coated or uncoated and is of paper, film, foil or fabric.

The WSF can also be cast on a conveyor instead of a liner.

As per the invention there is also provided a method in which WSF is cold water soluble, warm water soluble, hot water soluble or non-soluble depending upon the formulation, the WSF being formed from raw materials selected from polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, polymethacrylic acid, polyurethane, polyethyleneglycol, polyvinylpyrrolidone, proteinaceous binders such as gelatin, modified gelatins such as phthaloyl gelatin, polysaccharides such as starch, gum Arabic, pullulan and dextrin and water-soluble cellulose derivatives such as methyl cellulose, hydroxy propyl cellulose, hydroxy propyl methyl cellulose, hydroxy propyl ethyl cellulose, hydroxy ethyl cellulose, carboxy methyl cellulose either alone or combinations thereof.

As per the invention there is also provided a method in which the security element(s) is/are of overt or covert nature and is/are selected from optically variable pigments, multi-layer thin-film interference pigments, liquid crystal pigments, holographic pigments, interference coated particles, thermochromic pigments, photochromic pigments, luminescent compounds, magnetic compounds, infrared-absorbing compounds, UV-absorbing compounds, magnetic compounds, micro-engraved or microtextured flake pigments, forensic marking compounds, dyes, RFID taggants, nano particles, nano tracers, security markers printed security features like barcodes, metallized fibers, metallized/demetallized texts, active molecules, DNA taggants.

The WSF embedded with security element(s) can be slit in ribbons, tapes, perforated sheets, perforated tapes, perforated ribbons or cut sheets of any size.

The WSF embedded with security elements slit into ribbons, tapes, etc. can be inserted into a package during the process of making pouch. The ribbons, tapes, etc. will destroy itself irreversibly during the final usage when the entire pouch along with its contents will dissolve itself in water.

The WSF embedded/entrapped with security element(s) is in sheet form or roll form or pouch form as per the end use.

As per the invention there is also provided a method of manufacturing security packaging WSF comprising overt security element(s) like holograms embedded into the WSF by directly embossing a holographic plate on WSF preferably with liner which can be detached after the process of embossing.

The holograms are imprinted/imparted on the WSF with hot stamping foil method or by adhesive transfer method.

Other overt security element(s) like barcodes, microtexts are embedded in the WSF by printing them on WSF itself by known printing methods such as inkjet, flexo, gravure, web offset and the like.

As per the invention there is also provided a method of manufacturing security packaging WSF comprising mixing of security element(s) in the printing ink and printing letters or graphics on WSF with the printing ink consisting security element(s), forming a part of WSF itself.

DETAILED DESCRIPTION OF THE INVENTION

Figure 1:
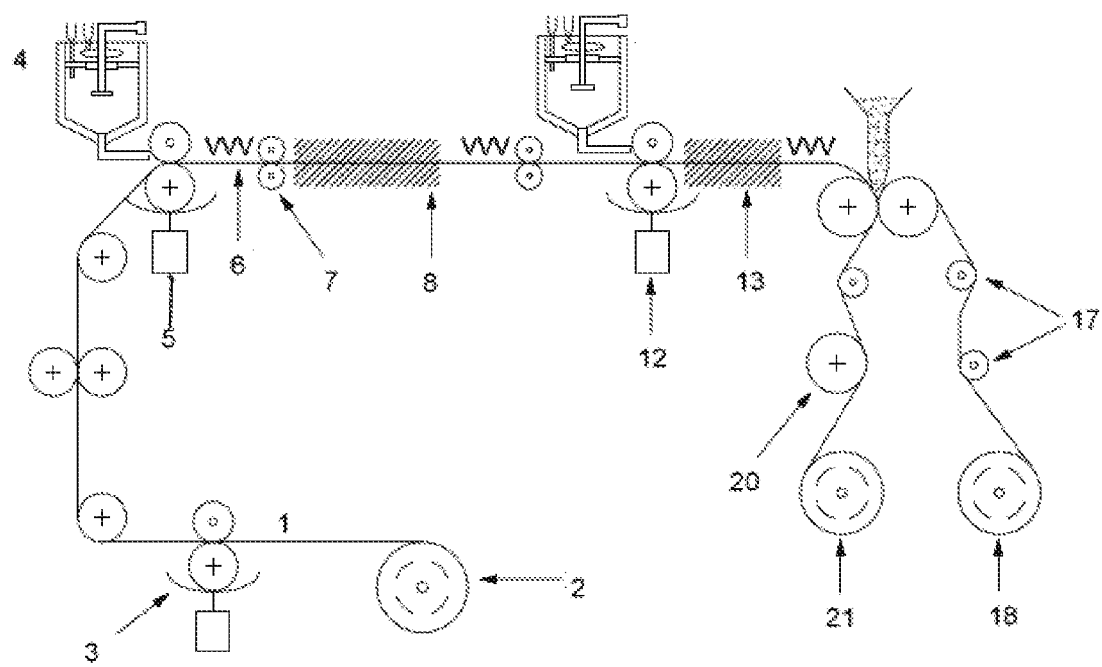
FIG. 1 is a schematic drawing of a method in accordance with the present invention.

The invention will now be described in detail with reference to accompanying drawings showing various embodiments:

The materials of the WSF formulation is taken in the batch reactor and mixed intimately to ensure complete dissolution in the desired solvent.

The raw materials used for making the water soluble film are selected from polyvinyl alcohol copolymer ionomers, polyvinyl alcohol homopolymer, non-ionomeric poly vinyl alcohol polymer, polymethacrylate, polyvinyl alcohol, polyacrylamide, polymethacrylamide, polyacrylic acid, polymethacrylic acid, polyurethane, polyethyleneglycol, polyvinylpyrrolidone, proteinaceous binders such as gelatin, modified gelatins such as phthaloyl gelatin, polysaccharides such as starch, gum Arabic, pullulan and dextrin and water-soluble cellulose derivatives such as methyl cellulose, hydroxy propyl cellulose, hydroxy propyl methyl cellulose, hydroxy propyl ethyl cellulose, hydroxy ethyl cellulose, carboxy methyl cellulose either alone or combinations thereof. However, these raw materials are by no means limiting. The water soluble films can be cold water soluble, warm water soluble, hot water soluble or non-soluble depending upon the formulation.

The preformed WSF used in the present invention can be a cast film or an extruded film depending upon the end application.

The security elements to be embedded into the WSF can be selected from optically variable pigments, multi-layer thin-film interference pigments, liquid crystal pigments, holographic pigments, interference coated particles, thermochromic pigments, photochromic pigments, luminescent compounds, magnetic compounds, infrared-absorbing compounds, UV-absorbing compounds, magnetic compounds, micro-engraved or microtextured flake pigments, forensic marking compounds, dyes, RFID taggants, nano particles, nano tracers, security markers printed security features like barcodes, metallized fibers, metallized/demetallized texts, active molecules, DNA taggants and the like.

Some of these security elements are of overt nature or of covert nature which can be identified on the shelf or off the shelf depending upon the security elements embedded in the WSF.

Covert security elements are ones that are not visible and will require a particular instrument for verifying the same, e.g., pigments, dyes, nano-particles, nano-tracers, active molecules DNA taggants, and the like. Covert security elements are thus machine verifiable.

A WSF package embedded with covert security elements, such as invisible inks or dyes, can be identified on the shelf under an ultra violet (UV) (long wave) fluorescing light source.

A WSF package embedded with covert security elements, such as nano-particles, can be identified on the shelf with the help of a 100× magnifying glass.

Some covert security elements can be identified off the shelf only as the package has to be taken to a laboratory having elaborate instruments and machines so as to read the embedded covert security elements. There may be a need to destroy the package in some cases. E.g., certain pigments which are infra-red light readable with an algorithm of software chain designed to read the reflected light and confirm the presence of such pigments/dyes/security elements or magnetic field readable pigments embedded in nano-particles which give an audible beep when the machine reader reaches the precise proximity etc.

Overt security elements are the ones that are visible (i.e., are human perceptible) and can be identified on the shelf almost instantaneously without need of an elaborate laboratory instruments or machines, e.g., holograms, barcodes, metallized/demetallized micro texts, RFID tags and the like. These kind of security elements are printed or embossed on the WSF and will form a part of WSF.

In one of the embodiments of this invention, the security elements to be embedded in the WSF are added to the batch solution and mixed thoroughly before feeding it to the casting head for further processing. The materials that can be taken into the batch mixing are selected from those that are water-soluble, sheer insensitive, temperature resistant, like certain UV security dyes, or machine readable pigments.

In another embodiment of this invention the security elements to be embedded in the WSF may optionally be introduced at the primary, secondary, tertiary and subsequent sprayers and/or at the second or subsequent casting heads fed from second and/or subsequent batch mixers.

In another embodiment of the present invention the security elements to be embedded is/are dispensed in between incoming cured or uncured WSFs.

In yet another embodiment of the present invention the security elements of overt nature, such as holograms, barcodes, are printed or embossed on the WSF.

Casting on the liner for manufacturing WSF embedded with security features by Batch Mix Method shown in FIG. 1 comprising of the following steps:

i. unwinding of the liner (1) at the unwinder (2) for the formation of a WSF. The liner can be optionally treated or untreated and coated or uncoated. The liners can be of paper, film, foil or fabric, preferably of film, more preferably of polyester film. The film liner can be in the range of 2 microns to 500 microns, preferably in the range of 10 microns 300 microns, more preferably in the range of 12 microns 250 microns. The film liner may be plain, embossed, gloss, matt, extrusion coated laminated or release coated depending on the desired characteristics of the end product. The paper liner that accepts temperatures needed for production of WSF, may be in the range of around 7 gms to around 500 gms, preferably a range of around 20 gm to around 300 gms, more preferably in the range of around 60 gm to around 180 gms. The paper liner may be plain, embossed, gloss, matt, extrusion coated laminated or release coated depending on the desired characteristics of the end product. The fabric liner can be made of cotton or synthetic yarns and solution coated, plain, embossed, gloss, matte, extrusion coated or laminated based on the desired end product properties.

ii. Optional coating of the liner with a primer via a primer coating station (3).

iii. Casting of WSF on the liner at primary casting head (5) with embedded security elements in the batch mix (4). The temperature of the batch solution ranging from 10° C. to 95° C., preferably from 13° C. to 90° C., more preferably from 15° C. to 85° C.

iv. Metering of the cast film at the primary casting head (5).

v. Smoothening of the film by passing it through smoothening rolls (7) with the embedded security elements at primary station.

vi. Drying of the WSF from step iii in the primary dryer section (8). The temperature in the dryer section ranging from 50° C. to 250° C., preferably from 60° C. to 200° C., more preferably 75° C. to 170° C.

vii. Casting of another layer of WSF with or without the security elements to be embedded at secondary casting head (12).

viii. Drying of the WSF from step vii in the secondary dryer section (13). The temperature in the secondary dryer section ranging from 50° C. to 200° C., preferably 60° C. to 160° C., more preferably 75° C. to 170° C.

ix. The multi-layered WSF of step viii is guided through hot/chilled cylinder (20) for rewinding or splitting at rewinder (21).

Optionally the above steps may also be carried out on a rolling conveyor instead of a liner.

Casting on the Liner for manufacturing WSF Embedded with security features by Application of Spraying Method shown in FIG. 1 comprising of the following steps:

i. Unwinding of the liner (1) at unwinder (2) for the formation of WSF. Optionally a conveyor can be used instead of a liner.

ii. Optional coating of a primer on the liner via a primer coating station (3).

iii. Casting of WSF with/without security elements to be embedded at primary casting head (5).

iv. Metering of the cast film at primary casting head (5).

v. Spraying of pre-measured quantity of security elements to be embedded by primary sprayer (6).

vi. Smoothening of the film with the embedded security elements at primary station by passing it through smoothening rolls (7).

vii. Drying of the WSF of the above step v at the primary dryer section (8). The temperature in the dryer section ranging from 50° C. to 250° C., preferably from 60° C. to 200° C., more preferably from 75° C. to 170° C.

viii. Casting of WSF with or without security elements to be embedded at secondary casting head (12).

ix. Drying of the WSF from step viii in the secondary dryer section (13). The temperature in the secondary dryer section ranging from 50° C. to 200° C., preferably from 60° C. to 160° C., more preferably from 75° C. to 170° C.

x. The multi-layered WSF of step viii is guided through hot/chilled cylinder (20) for rewinding or splitting at the rewinder.

Similarly, one or more security elements can be embedded into the WSF by the secondary, tertiary sprayers to form a multi-layered WSF embedded with security elements.

Casting on the Liner for manufacturing WSF embedded with security features by Online Entrapment Method as shown in FIG. 1 comprising of the following steps:

i. Unwinding of the liner (1) at the unwinder (2) for the formation of WSF, optionally a conveyor can be used.

ii. Optional coating of primer on the liner via a primer coating station (3).

iii. Casting of WSF with/without security elements to be embedded at primary casting head (5).

iv. Metering of the cast film at casting head (5).

v. Smoothening of the film with/without the embedded security elements at primary station by passing it through smoothening rolls (7).

vi. Drying of the WSF from step v in the primary dryer section (8). The temperature in the dryers ranging from 50° C. to 250° C., preferably from 60° C. to 200° C., more preferably from 75° C. to 170° C.

vii. Casting of WSF with or without the security elements to be embedded at secondary casting head (12).

viii. Drying of the WSF from step vii in the secondary dryer section (13). The temperature in the dryers ranging from 50° C. to 200° C., preferably from 60° C. to 160° C., more preferably from 75° C. to 140° C.

ix. Unwinding of a pre-formed WSF with or without liner from an unwinder (18) and guiding it through the guide rolls (17) to meet the WSF from step 8 for entrapping of security elements to be embedded. Both the liners along with WSF film, which may be semi-cured WSF and the entrapments, may remain in the roll form or sheet form in its original construction, stripping from casting liner can be done immediately or after a self-curing ageing period ranging from around 1 hrs. to around 720 hrs., prior to splitting the liners so as to deliver the final WSF product with entrapped materials. The preformed WSF used here can be a WSF formed by the extrusion process.

The preformed WSF used here can be a WSF made by a cast process or by extrusion process.

x. The multi-layered WSF of step ix may be guided through hot/chill cylinder (20) for rewinding or splitting at the rewinder (21). Optionally offline or online splitting between the WSF film and the liner can be done.

Figure 2:
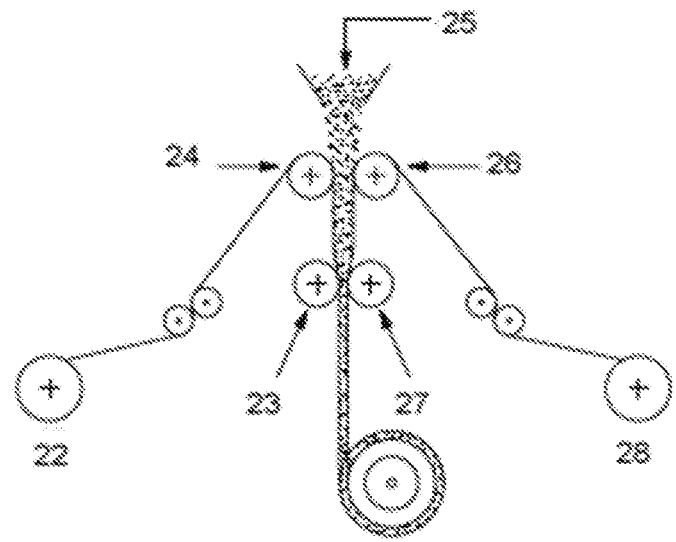
FIG. 2 is a schematic drawing of an alternative method in accordance with the present invention.

Offline Vertical Entrapment Method for manufacturing WSF embedded with security features as shown in FIG. 2 comprising of the following steps:

i. Unwinding of two preformed water soluble films with or without liner at the unwinders (22 and 28). The preformed WSFs used here can be WSFs formed by the extrusion process.

The preformed WSFs used here can be WSFs made by a cast process or by extrusion process.

ii. Dispensing of the security elements (25) vertically in between the two WSFs at guide rollers (24 and 26).

iii. Affixing of the two WSFs from step ii at the affixing rollers (23 and 27).

iv. Rewinding the multilayered WSF with security elements of step (iii) in roll form or sheet form or fan-fold form. The casting liners can be stripped immediately or after aging period of around 1 to around 720 hours, or can be supplied all together and the end user may be informed to strip the casting liner before use.

Figure 3:
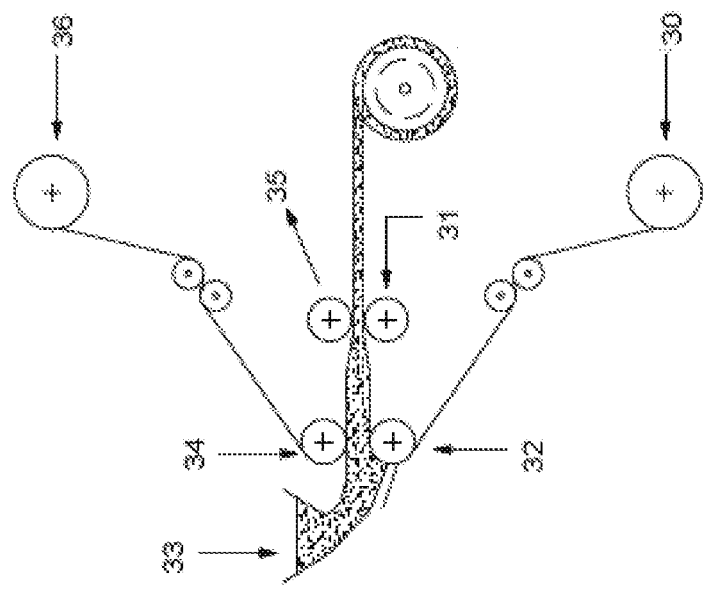
FIG. 3 is a schematic drawing of another alternative method in accordance with the present invention.

Offline Horizontal Entrapment Method for manufacturing WSF embedded with security features as shown in FIG. 3 comprising of the following steps:

i. Unwinding of two WSF films with or without liner at the unwinders (30 and 36). The preformed WSFs used here can be a WSF formed by the extrusion process.

ii. Dispensing of the security elements (33) horizontally in between two WSFs at guide rollers (32 and 34).

iii. Affixing of the two WSFs from step (ii) at the affixing rollers (31 and 35).

iv. Rewinding the WSF with security elements, of step (iii) in roll form or sheet form or fan-fold form. The casting liners can be stripped immediately or after aging period of around 1 hour to around 720 hours or can be supplied all together and the end user may be informed to strip the casting liner before use.

The WSF embedded with security elements can be slit in ribbons, tapes, perforated sheets, perforated tapes, perforated ribbons or cut sheets of any size.

The WSF embedded with security elements slit into ribbons, tapes, etc. can be inserted into a package during the process of making pouch. The ribbons, tapes, etc. will be destroyed irreversibly during the final usage when the entire pouch along with its contents will dissolve in water.

Such methods offer various product options such as:

1. Entrapped security elements in WSF with or without liner/carrier.
2. Entrapped security elements in WSF in Roll form or pouch form.
3. Entrapped security elements in WSF in Roll form with perforations.
4. Entrapped security elements in WSF in Sheet form with multiple pouches.
5. All above Entrapped security elements in WSF with casting liner for the consumer to remove after aging period of around 1 hour to around 720 hours.

The WSF film in the entrapment may be pre-embedded by means of batch mix or sprayer method or any other method explained above.

The above sequence may be repeated in multiple layers as per the requirements of the end use of the multiple WSFs embedded with security elements. Further this method also allows the manufacture of multilayered WSFs embedded with security elements using combinations of Cold WSFs and Hot WSFs in various sequences. It also provides the options of using cured/uncured films of CWSFs and HWSFs in any desired sequences.

As per one of the embodiment, the overt security elements like holograms can be embedded into the WSF by directly embossing from a holographic plate/cylinder/shim on WSF. The WSF used for this purpose is preferably with a liner.

Holograms can also be embedded in the WSF with the hot stamping foil method or by transfer method, wherein the holographic film is coated with an adhesive and the adhesive side of the holographic film is laminated to the WSF.

Other overt security elements such as microtexts, barcodes can be embedded in the WSF by printing on the WSF itself. The printing of microtexts, barcodes can be done by known printing methods such as inkjet, gravure, flexo, web off-print and the like.

All security elements and WSF shall irreversibly destroy itself upon dissolution of package in water during final usage of the packed product.

As per the methods mentioned above one or more security elements having similar and/or dissimilar properties can be embedded into one or more layers of WSF to form a multi-layered WSF. Also, one or more security elements can be synthesized and can be added in the same layer of WSF, e.g., DNA taggants can be synthesized with florescent pigments for on-shelf checking of presence of fluorescent pigment DNA. Actual DNA presence has to be done off the shelf by a method of PCR readers.

Also, one or more security elements can be positioned at a prerequisite place so as to come up in the same place in the final package. This can be done by inserting a strip of HWSF/non-soluble hydrophilic film embedded with security elements into the web of WSF during the process of casting the WSF. The other way of doing this is zone coating of a WSF batch mix embedded with security features onto a preformed WSF.

All security elements and WSF shall irreversibly destroy itself upon dissolution of package in water during final usage of the packed product. Covert security features like DNA, can be traced even after usage, for proof of usage of materials, by checking its presence at the place where the security film was destroyed such as soil or laundered clothes.

Security elements can also be mixed with printing inks and then particular designs or letters can be printed on the WSF. Here, the security elements will be present in the printed designs only and can be identified on the shelf or off the shelf depending upon the security elements embedded in the printing ink.

Example 1

10 ml of Tracetag DNA T7 TAG 1e*16 was added to 100 ml of fluorescent UV ink and mixed thoroughly. This synthesized mixture of security elements was then added to a 40 ltr batch-mix of WSF made out of the raw-materials mentioned herein before and mixed thoroughly. The batch mix comprising DNA and florescent UV ink was then cast on a liner as per the method described herein before to form a self-destructive irreversible security packaging WSF having thickness 45 microns. This security film can be used for various packaging purposes.

The presence of the fluorescent UV ink can be identified on the shelf under a UV reading lamp, but for identifying the DNA the package has to be carried to the laboratory and a separate process of covert forensic PCR checking is needed. The remnants of DNA taggants can also be checked after usage like in soil in case of agrochemicals and on washed clothes in case of a detergent package.

Example 2

100 ml of florescent UV ink was added to a 40 ltr batch-mix of WSF made out of the raw-materials mentioned herein before and mixed thoroughly. The batch mix comprising florescent UV ink was then cast on a liner as per the above process to form an irreversibly self-destructive security packaging WSF having thickness 35 microns. The same WSF with florescent UV ink was embossed with holograms at prerequisite places. The holograms are visible instantaneously while the presence of the florescent UV ink can be identified under a UV reading lamp. Hence, here both the security features can be identified on the shelf. During the process of final usage of the package, the same shall dissolve, disintegrate and shall irreversibly be destroyed.

Example 3

RFID tags were printed at prerequisite places on a hot water soluble film. This HWSF printed with RFID tags was then accurately cut into thin strips of 20 mm width. A strip of HWSF printed with RFID was then positioned and inserted into a web of CWSF during the process of casting the CWSF. This security element can be read by RFID machine reader which has been specifically designed to read the outcome. During the process of final usage of the package, the same shall dissolve, disintegrate and shall irreversibly destroy itself.

It is now clear that the self-destructive security packaging film can be produced by methods mentioned herein before and that the same can be used to secure various types of packages to ensure that the rightful owner gets their earnings and the fraudsters are dealt with properly by the legal/Judiciary systems prevailing in respective countries.

Such security elements embedded WSFs are used for diverse applications, such as, but not limited to, embedding such WSF into a bed of pulp to make security paper, or to make a pouch or a web or a slit tape or any article from such a security film to deliver pesticides, seeds, drugs, veterinary products, agrochemicals, perfumes, softeners, flavors, detergents, etc., so as to identify the products while on the shelf as well as after consumption by reading the reactions of the security elements while the package is intact or reading the reactions of the security elements after the package has been dissolved and traces of such security elements can be observed on the used areas of the product which can be for example soil in case of agrochemicals/seeds or garments in case of detergents, softeners etc.

A security element embedded WSF can also be converted into self-adhesive web and subsequently converted into a printed seal with a barcode, including a 2D or 3D barcode. This self-adhesive label/seal can be applied for example to secure the opening of a package or a bottle with instructions to dissolve seal in water to open the package.

The invention claimed is:

1. A security film comprising at least one layer of water soluble film and at least one inbuilt security element; wherein said at least one layer of water soluble film is cold water soluble; wherein said at least one security element is human or machine perceptible whereby the security film is adapted to enable verification of the authenticity of a product incorporating the security film prior to use of the product;
   wherein said at least one inbuilt security element is embedded in said at least one layer of water soluble film, or entrapped between layers of water soluble film when said security film is formed from two or more layers of water soluble film;
   wherein said at least one layer of water soluble film is formed from a cold water soluble polymer such that said security film dissolves or disperses in cold water during use so as to destroy the security film irreversibly during final usage;
   wherein said at least one inbuilt security element is in the form of a pattern, image, logo, barcode, or digital information, and
   wherein said at least one inbuilt security element being formed of a material selected from the group consisting of optically variable pigments, multi-layer thin-film interference pigments, liquid crystal pigments, holographic pigments, interference coated particles, thermochromic pigments, photochromic pigments, infrared-absorbing compounds, micro-engraved or microtextured flake pigments, forensic marking compounds, dyes, RFID taggants, nano-particles, nano-tracers, security markers printed security features, active molecules, DNA taggants, and combinations thereof.

2. The security film according to claim 1, wherein said at least one inbuilt security element comprises at least a first security element and a second security element different from said first security element; said first security element and second security element having similar or dissimilar properties.

3. The security film according to claim 1, wherein the at least one layer of water soluble film is made of raw materials selected from polyvinyl alcohol copolymer ionomers, polyvinyl alcohol homopolymer, non-ionomeric polyvinyl alcohol polymer, polymethacrylate, polyvinyl alcohol, polyacrylamide, polymethacrylamide, polyacrylic acid, polymethacrylic acid, polyurethane, polyethyleneglycol, polyvinylpyrrolidone, proteinaceous binders, polysaccharides, and water-soluble cellulose derivatives either alone or combinations thereof.

4. The security film according to claim 3 wherein said proteinaceous binders are selected from the group consisting of gelatin, modified gelatins, and combinations thereof; or
   wherein the polysaccharides are selected from the group consisting of starch, gum Arabic, pullulan and dextrin, and combinations thereof; or
   wherein the water-soluble cellulose derivatives are selected from the group consisting of methyl cellulose, hydroxy propyl cellulose, hydroxy propyl methyl cellulose, hydroxy propyl ethyl cellulose, hydroxy ethyl cellulose, carboxy methyl cellulose, and combinations thereof.

5. The security film according to claim 1, wherein said at least one inbuilt security element is light source readable, machine readable PCR, or otherwise readable by any mechanical, electrical or digital device.

6. The security film of claim 1 wherein said at least one security element remains traceable after said film has been dissolved in water.

7. An irreversibly self-destructive water-soluble security film comprising at least a first layer of water soluble film and a second layer of water soluble film and at least a first security element and a second security element;

said first and second security elements being embedded in one of the first or second layers of the water soluble film and/or entrapped between the first and second layers of water soluble film; wherein first and second layers of water soluble film are each formed from a water soluble polymer such that the self-destructive security packaging water soluble film dissolves or disperses in water so as to destroy itself irreversibly during final usage and wherein the first and second security elements are different and wherein the first security element is overt and the second security element is covert.

8. The security film according to claim 7 wherein one of said first and second security elements is human perceptible and the other of said first and second security elements is machine verifiable.

9. The security film according to claim 7 wherein one of said first and second security elements is embedded in at least one of the first and second layers of water soluble film and the other of said first and second security elements is entrapped between the first and second layers of water soluble film.

10. An irreversibly self-destructive water-soluble security film comprising one or more layers of cold water soluble film and at least one inbuilt security element, wherein the at least one inbuilt security element is adapted to be perceived or verified by human or machine whereby the security film is adapted to enable verification of the authenticity of a product incorporating the security film prior to use of the product, wherein said at least one security element remains traceable after said film has been dissolved in cold water whereby the security film is adapted to verity the authenticity of a product incorporating the security film after use of the product; and wherein said at least one or more layers of water cold soluble film is formed from a cold water soluble polymer such that destructive security film dissolves or disperses in water so as to destroy itself irreversibly during final usage, and wherein the inbuilt security element is:

a sprayed security element;

an embossed security element imparted on the at least one layer of water soluble film by a hot stamping foil method or by adhesive transfer; or entrapped between layers of water soluble film when the security film comprises at least two layers of cold water soluble film.

11. The security film according to claim 10, wherein the at least one inbuilt security element is printed or embossed on said at least one layer of water soluble film, thereby forming a part of said at least one water soluble film.

12. The security film according to claim 11 wherein the at least one inbuilt security element is a hologram, barcode, or microtext.

13. The security film according to claim 11 wherein the at least one inbuilt security element is positioned at a prerequisite place in the at least one water soluble film.

14. An irreversible self-destructive water soluble security film having at least one inbuilt security element; said film comprising:

(i) at least one layer of a cold water soluble film, said at least one inbuilt security element being embedded in said at least one layer of cold water soluble film, or (ii) at least two layer of cold water soluble film, said at least one inbuilt security element being entrapped between layers of said security film, the at least one layer or the at least two layers of cold water soluble film being formed from a water soluble polymer such that the water soluble film dissolves or disperses in cold water so as to destroy itself irreversibly during final usage, said at least one inbuilt security element being printed or embossed on the at least one layer of water soluble film, and the security element being a hologram, barcode, or metallized/demetallized microtext which is capable of being perceived or verified by human or machine to verify the authenticity of a product incorporating the security film prior to use of the product.

15. The security film according to claim 14 wherein the security film is adapted to be converted into a self-adhesive web and further converted into a printed seal with a barcode including a 2D or 3D barcode forming a self-adhesive label/seal used for securing the openings of a package or a bottle.

* * * * *

UNITED STATES PATENT AND TRADEMARK OFFICE
CERTIFICATE OF CORRECTION

| | | |
|---|---|---|
| PATENT NO. | : 11,192,343 B2 | Page 1 of 1 |
| APPLICATION NO. | : 16/216469 | |
| DATED | : December 7, 2021 | |
| INVENTOR(S) | : Shilpan Pravinchandra Patel and Nikita Kamlesh Thanawala | |

It is certified that error appears in the above-identified patent and that said Letters Patent is hereby corrected as shown below:

In the Claims

In Column 13, Line 39, Claim 10:
Replace the word "verity" with the word --verify--

In Column 13, Line 43, Claim 10:
Replace the word "destructive" with the word --self-destructive--

In Column 14, Line 9, Claim 11:
Delete the words "printed or"

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*